(12) United States Patent
Kida

(10) Patent No.: US 11,965,104 B2
(45) Date of Patent: Apr. 23, 2024

(54) INK SET AND INKJET RECORDING APPARATUS

(71) Applicant: KYOCERA Document Solutions Inc., Osaka (JP)

(72) Inventor: Yukari Kida, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 226 days.

(21) Appl. No.: 17/319,878

(22) Filed: May 13, 2021

(65) Prior Publication Data
US 2021/0355334 A1 Nov. 18, 2021

(30) Foreign Application Priority Data

May 14, 2020 (JP) ................... 2020-085009

(51) Int. Cl.
C09D 11/326 (2014.01)
B41J 2/165 (2006.01)
(Continued)

(52) U.S. Cl.
CPC ......... *C09D 11/326* (2013.01); *B41J 2/16552* (2013.01); *C08K 3/04* (2013.01);
(Continued)

(58) Field of Classification Search
CPC ....... C09D 11/326; C09D 11/38; C09D 11/14; C09D 11/40; C09D 11/324;
(Continued)

(56) References Cited

U.S. PATENT DOCUMENTS

2010/0159212 A1* 6/2010 Ezaki .................. C09D 11/326
524/548
2013/0079447 A1* 3/2013 Koike .................. C09D 11/106
524/377
(Continued)

FOREIGN PATENT DOCUMENTS

JP 2006274128 A * 10/2006
JP 2006348125 A * 12/2006
(Continued)

OTHER PUBLICATIONS

"Standard Test Method for Carbon Black Oil Absorption Number (OAN)." ASTM International, 2011, www.antpedia.com/standard/pdf/G49/1612/ASTM%20D2414-2011_2843.pdf. (Year: 2011).*
(Continued)

*Primary Examiner* — Jennifer A Smith
*Assistant Examiner* — Jeffrey Eugene Barzach
(74) *Attorney, Agent, or Firm* — Studebaker & Brackett PC

(57) ABSTRACT

An ink set includes an inkjet ink and a cleaning solution. The inkjet ink contains a first aqueous medium, a carbon black, a dispersing resin, a first zwitterionic surfactant having an amidoalkylbetaine structure, and a first sugar alcohol. The carbon black has an oil absorption number of at least 130 mL/100 g and no greater than 165 mL/100 g. A ratio of a content of the dispersing resin to a content of the carbon black is at least 12.0% by mass and no greater than 19.0% by mass. The cleaning solution contains a second aqueous medium, a second zwitterionic surfactant having an amidoalkylbetaine structure, and a second sugar alcohol.

6 Claims, 4 Drawing Sheets

(51) Int. Cl.
*C08K 3/04* (2006.01)
*C08K 5/053* (2006.01)
*C08K 5/19* (2006.01)
*C08K 5/20* (2006.01)
*C08L 25/08* (2006.01)
*C08L 33/02* (2006.01)
*C09D 11/38* (2014.01)

(52) U.S. Cl.
CPC .............. *C08K 5/053* (2013.01); *C08K 5/19* (2013.01); *C08K 5/20* (2013.01); *C08L 25/08* (2013.01); *C08L 33/02* (2013.01); *C09D 11/38* (2013.01); *B41J 2002/16558* (2013.01)

(58) Field of Classification Search
CPC .......... B41J 2/16552; B41J 2002/16558; B41J 2/16585; B41J 2/16526; B41J 2002/16591; B41J 2/16538; C08K 3/04; C08K 5/053; C08K 5/19; C08K 5/20; C08L 25/08; C08L 33/02; C08F 220/06
See application file for complete search history.

(56) References Cited

U.S. PATENT DOCUMENTS

| | | | | |
|---|---|---|---|---|
| 2015/0077465 | A1* | 3/2015 | Haijima | C11D 1/72 524/106 |
| 2016/0297980 | A1* | 10/2016 | Shinohara | C09B 35/46 |
| 2017/0275561 | A1* | 9/2017 | Sato | C11D 1/88 |
| 2018/0362788 | A1* | 12/2018 | Morita | C09D 11/037 |

FOREIGN PATENT DOCUMENTS

| | | | | | |
|---|---|---|---|---|---|
| JP | 2007-217508 | A | | 8/2007 | |
| JP | 2010235712 | A | * | 10/2010 | |
| JP | 2010285504 | A | * | 12/2010 | |
| JP | 2018100341 | A | * | 6/2018 | |
| JP | 2018202760 | A | * | 12/2018 | |
| JP | 2019043030 | A | * | 3/2019 | |
| JP | 2019172764 | A | * | 10/2019 | ............... C11D 1/29 |
| JP | 2020128351 | A | * | 8/2020 | |

OTHER PUBLICATIONS

English Machine Translation of JP2018100341A ("Machine_Translation_Usui_JP_2018100341_A") (Year: 2018).*
English Machine Translation of JP2006274128A ("Machine_Translation_Ota_JP_2006274128_A") (Year: 2006).*
English Machine Translation of JP2010285504A ("Machine_Translation_Otsuka_JP_2010285504_A") (Year: 2010).*
English Machine Translation of JP2018202760A ("Machine_Translation_Takaori_JP_2018202760_A") (Year: 2018).*
English machine translation of JP-2006348125-A (Year: 2006).*
English machine translation of JP-2019043030-A (Year: 2019).*
English machine translation of JP-2020128351-A (Year: 2020).*
English machine translation of JP-2019172764-A (Year: 2019).*
English machine translation of JP-2010235712-A (Year: 2010).*

* cited by examiner

INK SET AND INKJET RECORDING APPARATUS

INCORPORATION BY REFERENCE

The present application claims priority under 35 U.S.C. § 119 to Japanese Patent Application No. 2020-085009, filed on May 14, 2020. The contents of this application are incorporated herein by reference in their entirety.

BACKGROUND

The present disclosure relates to an ink set and an inkjet recording apparatus.

With recent increases in their image quality and recording speed, inkjet recording apparatuses are increasingly used for mass printing in the business fields. In association therewith, the inkjet recording apparatuses are required to have high reliability of ink (e.g., high ejection stability and preservation stability of ink) and provide high quality of formed images (e.g., high image density and inhibition of void defect production). Note that void defects are produced in a manner that pigment contained in ink having landed on a recording medium penetrates into the recording medium without staying on the surface of the recording medium.

A recording section of an inkjet recording apparatus is provided with a water-repellent film on its ink ejection surface. The water-repellent film has a function of inhibiting occurrence of a phenomenon in which accuracy of ink placement decreases due to spreading wetting of ink over the ink ejection surface of the recording section in ink ejection. The water-repellent film gradually wear through cleaning on the ink ejection surface of the recording section. As such, there is a demand for inhibition of the water-repellent film of the inkjet recording apparatus from wearing.

From the perspective of environmental impact, an ink (water-based ink) containing an aqueous medium is preferable as an inkjet ink used in the inkjet recording apparatuses. Examples of the water-based ink include water-based inks containing a pigment dispersion constituted by a dispersing resin and a pigment, and water-based inks containing a self-dispersing pigment. Among the above water-based inks, the water-based inks containing a self-dispersing pigment tend to promote wear of the water-repellent film because of inclusion of the self-dispersing pigment, which is an inorganic component with relatively high hardness, in a state of being bare. Furthermore, the self-dispersing pigment is a highly water-soluble component, and therefore is not suitable for formation of water-resistant images. By contrast, the water-based inks containing a pigment dispersion, in which pigment easily penetrates into a recording medium, tend to lead to void defect production and a decrease in image density of formed images. A decrease in image density of formed images and void defect production as above are significant in image formation on a recording medium with an unsmooth surface (e.g., paper with a surface not subjected to coating).

In order to increase image density with use of such a water-based ink containing a pigment dispersion, a method is proposed for example in which two carbon blacks each having a specific surface area and a specific oil absorption number are used in combination.

SUMMARY

An ink set according to an aspect of the present disclosure includes an inkjet ink and a cleaning solution. The inkjet ink contains a first aqueous medium, a carbon black, a dispersing resin, a first zwitterionic surfactant having an amidoalkylbetaine structure, and a first sugar alcohol. The carbon black has an oil absorption number of at least 130 mL/100 g and no greater than 165 mL/100 g. A ratio of a content of the dispersing resin to a content of the carbon black is at least 12.0% by mass and no greater than 19.0% by mass. The first sugar alcohol has a content ratio in the inkjet ink of at least 5.0% by mass and no greater than 15.0% by mass. The cleaning solution contains a second aqueous medium, a second zwitterionic surfactant having an amidoalkylbetaine structure, and a second sugar alcohol. The second sugar alcohol has a content ratio in the cleaning solution of at least 10.0% by mass and no greater than 22.0% by mass.

An inkjet recording apparatus according to an aspect of the present disclosure is an inkjet recording apparatus including a recording head that uses the aforementioned ink set. The recording head includes a recording section that ejects the inkjet ink toward an image formation area of a recording medium, and a cleaner that cleans an ink ejection surface of the recording section with the cleaning solution. The ink ejection surface is covered with a water-repellent film.

DETAILED DESCRIPTION

Figure 1:
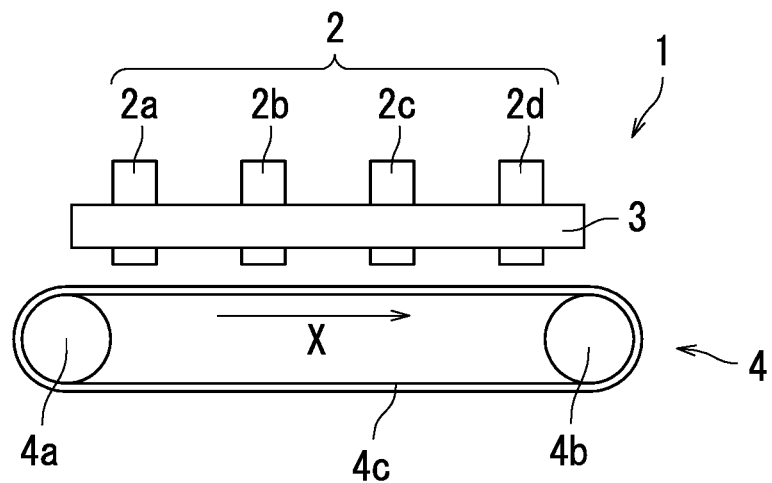
FIG. 1 is a diagram illustrating an example of an inkjet recording apparatus according to a second embodiment of the present disclosure.

The following describes embodiments of the present disclosure. Note that in the present specification, "pH" refers to a hydrogen ion index as measured at 25° C. unless otherwise stated. The term "(meth)acryl" may be used as a generic term for both acryl and methacryl. An oil absorption number of a carbon black is a value as measured in accordance with a method described in ASTM D2414 "Standard Test Method for Carbon Black—Oil Absorption Number (OAN)". Any of components described in the present specification may be used solely or in combination.

First Embodiment: Ink Set

An ink set according to a first embodiment of the present disclosure will be described below. The ink set according to the present disclosure includes an inkjet ink (also referred to below as an ink) and a cleaning solution. The ink contains a first aqueous medium, a carbon black, a dispersing resin, a first zwitterionic surfactant having an amidoalkylbetaine structure, and a first sugar alcohol. The carbon black has an oil absorption number of at least 130 mL/100 g and no greater than 165 mL/100 g. A ratio of a content of the dispersing resin to a content of the carbon black (also referred to below as ratio p) is at least 12.0% by mass and no greater than 19.0% by mass. The first sugar alcohol has a content ratio in the ink of at least 5.0% by mass and no greater than 15.0% by mass. The cleaning solution contains a second aqueous medium, a second zwitterionic surfactant having an amidoalkylbetaine structure, and a second sugar alcohol. The second sugar alcohol has a content ratio in the cleaning solution of at least 10.0% by mass and no greater than 22.0% by mass.

The cleaning solution included in the ink set of the present disclosure is suitable as a cleaning solution for cleaning an ink ejection surface of a recording section of a later-described inkjet recording apparatus, for example.

As a result of the ink set of the present disclosure having the above features, the ink has excellent preservation stability and ejection stability, void defect production and wear of a water-repellent film of the recording section of the inkjet recording apparatus can be inhibited, and images with high image density can be formed. Presumably, the reasons therefor are as follows.

The following describes a reason for the ink set of the present disclosure enabling formation of images with increased image density. The ink included in the ink set of the present disclosure contains a carbon black (high-structure carbon black) with a relatively high oil absorption number. Due to its complex structure, the high-structure carbon black tends to stay on the surface of a recording medium after the ink has landed on the surface of the recording medium. As such, with the ink set of the present disclosure, in which the ink contains the high-structure carbon black, images with high image density can be formed.

The following describes a reason for the ink set of the present disclosure enabling inhibition of void defect production and being excellent in preservation stability. The ink included in the ink set of the present disclosure contains a dispersing resin. The dispersing resin improves dispersibility of pigment to improve preservation stability of the ink. Furthermore, use of an ink with a low content of a dispersing resin can achieve inhibition of void defect production. The reason therefor is described next. In an ink containing a dispersing resin of only a small amount, a pigment is dispersed in a slightly unstable state in an aqueous medium. The pigment in the ink as above tends to cohere and stay on the surface of a recording medium after the ink has landed on the surface of the recording medium. As a result, void defect production can be inhibited. In the ink included in the ink set of the present disclosure, the ratio p of the content of the dispersing resin to the content of the carbon black is at least 12.0% by mass, which means that the ink contains a certain amount of the dispersing resin. Therefore, the ink is excellent in preservation stability. Furthermore, in the ink included in the ink set of the present disclosure, the ratio p is no greater than 19.0% by mass, which means that the content of the dispersing resin is relatively low. Therefore, void defect production can be inhibited.

The following describes a reason why the ink set of the present disclosure is excellent in ejection stability. As described above, in the ink set of the present disclosure, pigment is dispersed in the first aqueous medium in a slightly unstable state due to the relatively low content of the dispersing resin in the ink. An ink such as above, by nature, has a tendency to reduce ejection stability of the ink as the pigment agglomerate and adhere to the surface of ink nozzles. By contrast, in the ink set of the present disclosure, the ink contains the first sugar alcohol while the cleaning solution contains the second sugar alcohol. Sugar alcohols are compounds excellent in deliquescence. Therefore, as a result of the ink containing the first sugar alcohol and the cleaning solution containing the second sugar alcohol, the ink set of the present disclosure moisturizes the surfaces of the ink nozzles. Consequently, the ink set of the present disclosure can inhibit the pigment from agglomerating and adhering to the surfaces of the ink nozzles to increase ejection stability of the ink even though the content of the dispersing resin is relatively low in the ink.

The following described a reason why the ink set of the present disclosure can inhibit the water-repellent film of the recording section of the inkjet recording apparatus from wearing. As described above, the ink of the ink set of the present disclosure contains a high-structure carbon black. The high-structure carbon black has a complex structure and therefore tends to function as abrasive particles that wear down the water-repellent film of the recording section of the inkjet recording apparatus. Furthermore, in the ink set of the present disclosure, the high-strength carbon black is dispersed in the first aqueous medium in a state of being somewhat nearly bare due to the relatively low content of the dispersing resin in the ink. The high-structured carbon black present in such a state is further prone to function as abrasive particles. By contrast, in the ink set of the present disclosure, the ink contains the first zwitterionic surfactant while the cleaning solution contains the second zwitterionic surfactant. Use of the ink and the cleaning solution each containing a surfactant can inhibit wear of the water-repellent film of the recording section of the inkjet recording apparatus by lubricating action of the surfactants. In particular, the first zwitterionic surfactant and the second zwitterionic surfactant each having an amidoalkylbetaine structure tend to exhibit the lubricating action more than the other surfactants although detailed reason is unknown. Accordingly, the ink set of the present disclosure can inhibit wear of the water-repellent film of the recording section of the inkjet recording apparatus even though the ink set includes the ink that contains the high-structure carbon black and in which the dispersing resin has a relatively low content. The ink set of the present disclosure will be described below in detail.

[Ink]

The ink contains the first aqueous medium, the carbon black, the dispersing resin, the first zwitterionic surfactant having an amidoalkylbetaine structure, and the first sugar alcohol. Preferably, the ink further contains at least one of a nonionic surfactant and a basic compound.

The ink has a pH of preferably at least 7.5 and no greater than 10.0, and further preferably at least 8.5 and no greater than 9.0. Here, the first zwitterionic surfactant tends to be readily ionized in an alkaline environment to exhibit further excellent lubricating action. Therefore, when the ink has a pH of at least 7.5 and no greater than 10.0, the water-repellent film of the recording section of the inkjet recording apparatus can be further effectively inhibited from wearing.

(First Aqueous Medium)

The first aqueous medium is a medium including water. The first aqueous medium may function as a solvent or function as a dispersion medium. Examples of the first aqueous medium include an aqueous medium containing only water and an aqueous medium containing water and a water-soluble organic solvent.

The content ratio of the water in the ink is preferably at least 30.0% by mass and no greater than 80.0% by mass, and more preferably at least 40.0% by mass and no greater than 55.0% by mass. As a result of the content ratio of the water being set to at least 30.0% by mass and no greater than 80.0% by mass, ejection stability of the ink can be enhanced.

Examples of the water-soluble organic solvent that may be contained in the first aqueous medium include glycol compounds, glycol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, propylene glycol, 1,5-pentanediol, 1,2-octanediol, 1,8-octanediol, 3-methyl-1,5-pentanediol, diethylene glycol, triethylene glycol, and tetraethylene glycol.

Examples of the glycol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

An example of the acetate compounds is diethylene glycol monoethyl ether acetate.

Preferable examples of the water-soluble organic solvent that may be contained in the first aqueous medium include 3-methyl-1,5-pentanediol, triethylene glycol monobutyl ether, 2-pyrrolidone, 1,5-pentanediol, and 1,2-octanediol.

The content ratio of the water-soluble organic solvent in the ink is preferably at least 10.0% by mass and no greater than 65.0% by mass, and more preferably at least 25.0% by mass and no greater than 40.0% by mass. As a result of the content ratio of the water-soluble organic solvent being set to at least 10.0% by mass and no greater than 65.0% by mass, ejection stability of the ink can be enhanced.

(Carbon Black)

The carbon black functions as a black pigment in the ink. The ink may further contain another pigment in addition to the carbon black.

The carbon black has an oil absorption number of at least 130 mL/100 g and no greater than 165 mL/100 g. The oil absorption number of the carbon black is preferably at least 130 mL/100 g and no greater than 155 mL/100 g, and more preferably at least 130 mL/100 g and no greater than 145 mL/100 g. As a result of the oil absorption number of the carbon black being set to at least 130 mL/100 g, images with high image density can be formed. As a result of the oil absorption number of the carbon black being set to no greater than 165 mL/100 g, the water-repellent film of the recording section of the inkjet recording apparatus can be inhibited from wearing.

The carbon black has a content ratio in the ink of preferably at least 2.0% by mass and no greater than 20.0% by mass, and more preferably at least 5.0% by mass and no greater than 15.0% by mass. As a result of the content ratio of the carbon black being set to at least 2.0% by mass, image density of formed images can be increased. As a result of the content ratio of the carbon black being set to no greater than 20.0% by mass, ejection stability of the ink can be enhanced.

(Dispersing Resin)

The dispersing resin functions as a dispersant for dispersing the pigment in the first aqueous medium. Examples of the dispersing resin include (meth)acrylic resin, styrene-(meth)acrylic resin, polyvynily resin, polyester resin, amino resin, epoxy resin, urethane resin, polyether resin, polyamide resin, phenolic resin, silicone resin, fluororesin, styrene-maleic acid copolymers, styrene-maleic acid half-ester copolymers, vinylnaphthalene-acrylic acid copolymers, and vinylnaphthalene-maleic acid copolymers.

The (meth)acrylic resin is a polymer of (meth)acrylic acid or (meth)acrylic acid alkyl ester. The styrene-(meth)acrylic resin is a copolymer of styrene and (meth)acrylic acid or (meth)acrylic acid alkyl ester.

Preferably, the dispersing resin is anionic. When the dispersing resin is anionic, the dispersing resin may form a salt (e.g., sodium salt or potassium salt). A preferable dispersing resin is styrene-(meth)acrylic resin, and a copolymer of styrene and acrylic acid is more preferable.

The ratio p of the content of the dispersing resin to the content of the carbon black is at least 12.0% by mass and no greater than 19.0% by mass. Preferably, the ratio p is at least 14.0% by mass and no greater than 18.0% by mass. As a result of the ratio p being set to at least 12.0% by mass, preservation stability and ejection stability of the ink can be enhanced. As a result of the ratio p being set to no greater than 19.0% by mass, the pigment can be dispersed in the first aqueous medium in a slightly unstable state. Accordingly, the pigment tends to agglomerate and stay on the surface of a recording medium after ink has landed on the surface of the recording medium, thereby enabling inhibition of void defect production.

The content ratio of the dispersing resin in the ink is preferably at least 1.2% by mass and no greater than 1.9% by mass, and more preferably at least 1.4% by mass and no greater than 1.8% by mass. As a result of the content ratio of the dispersing resin being set to at least 1.2% by mass, preservation stability and ejection stability of the ink can be further enhanced. As a result of the content ratio of the dispersing resin being set to no greater than 1.9% by mass, void defect production can be further effectively inhibited.

(First Zwitterionic Surfactant)

The first zwitterionic surfactant has an amidoalkylbetaine structure. The first zwitterionic surfactant inhibits the water-repellent film of the recording section of the inkjet recording apparatus from wearing.

The first zwitterionic surfactant preferably contains a compound represented by the following general formula (1).

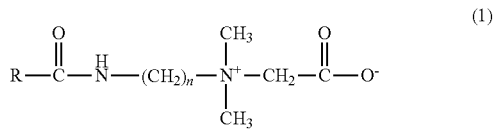

In general formula (1), R represents a monovalent chain hydrocarbon group having a carbon number of at least 6 and no greater than 20. n represents an integer of at least 1 and no greater than 5.

Preferably, R represents a monovalent chain hydrocarbon group having a carbon number of at least 10 and no greater than 18. Preferable examples of the monovalent chain hydrocarbon group represented by R include a chain alkyl group and a chain alkenyl group. Preferably, n represents 3.

Example of the first zwitterionic surfactant include fatty acid amide propyl betaine surfactants. Examples of the fatty acid amide propyl betaine surfactants include coconut oil fatty acid amidopropyl betaine, lauric acid amide propyl betaine, palm kernel amidopropyl betaine, amidepropyl betaine isostearate, and amidopropyl linoleate. A preferable first zwitterionic surfactant is coconut oil fatty acid amidopropyl betaine, lauric acid amide propyl betaine, or palm kernel amidopropyl betaine.

The content ratio of the first zwitterionic surfactant in the ink is at least 0.3% by mass and no greater than 4.0% by mass, for example. The content ratio of the first zwitterionic surfactant is preferably at least 0.7% by mass and no greater than 2.0% by mass, and more preferably at least 0.7% by mass and no greater than 1.3% by mass. As a result of the content ratio of the first zwitterionic surfactant being set to at least 0.3% by mass, the water-repellent film of the recording section of the inkjet recording apparatus can be further effectively inhibited from wearing.

(First Sugar Alcohol)

The first sugar alcohol moisturizes the surfaces of the ink nozzles of the inkjet recording apparatus to enhance ejection stability of the ink. The first sugar alcohol is a compound formed by reducing a carbonyl group of a sugar compound (e.g., aldose or ketose). The first sugar alcohol has a large number of hydroxyl groups to exhibit an excellent moisturizing property.

Examples of the first sugar alcohol include sorbitol, maltitol, xylitol, erythritol, lactitol, mannitol, threitol, arabitol, ribitol, isitol, volemitol, perseitol, and galactitol. Of the above examples, sorbitol and maltitol have a characteristic to stably exhibit moisturizing effect without being unaffected by humidity of the outside air. Therefore, sorbitol or maltitol is preferable as the first sugar alcohol.

The content ratio of the first sugar alcohol in the ink is at least 5.0% by mass and no greater than 15.0% by mass. Preferably, the content ratio of the first sugar alcohol in the ink is at least 6.0% by mass and no greater than 10.0% by mass. As a result of the content ratio of the first sugar alcohol being set to at least 5.0% by mass, ejection stability of the ink can be enhanced. As a result of the content ratio of the first sugar alcohol being set to no greater than 15.0% by mass, an excessive increase in viscosity of the ink can be suppressed.

(Basic Compound)

A basic compound makes the pH of the ink more alkaline. As describe above, the first zwitterionic surfactant tends to be readily ionized in an alkaline environment to exhibit further excellent lubricating action. Therefore, when the ink contains a basic compound, the water-repellent film of the recording section of the inkjet recording apparatus can be further effectively inhibited from wearing.

Examples of the basic compound include hydroxides of alkali metals (e.g., potassium hydroxide and sodium hydroxide), hydroxides of alkali earth metals (e.g., calcium hydroxide), carbonates of alkali metals (e.g., potassium carbonate and sodium carbonate), and ammonia. A preferable basic compound is sodium hydroxide.

(Nonionic Surfactant)

A nonionic surfactant enhances compatibility and dispersion stability of each component contained in the ink. Furthermore, the nonionic surfactant enhances permeability (wettability) of the ink to a recording medium.

Examples of the nonionic surfactant include polyoxyethylene dodecyl ether, polyoxyethylene hexadecyl ether, polyoxyethylene nonylphenyl ether, polyoxyethylene sorbitan monooleate ether, monodecanoyl sucrose, and ethylene oxide adducts of acetylene glycol. A preferable nonionic surfactant is an ethylene oxide adduct of acetylene glycol.

In a case in which the ink contains a nonionic surfactant, the content ratio of the nonionic surfactant in the ink is preferably at least 0.1% by mass and no greater than 2.0% by mass, and more preferably at least 0.2% by mass and no greater than 0.6% by mass.

(Additive)

The ink may further contain a known additive (e.g., a solution stabilizer, an anti-drying agent, an antioxidant, a viscosity modifier, a pH adjuster, and antifungal agent) according to necessity.

(Method for Producing Ink)

The ink can be produced for example by mixing the first aqueous medium, a pigment dispersion containing the pigment and the dispersing resin, the first zwitterionic surfactant, the first sugar alcohol, and an optional component added as necessary (e.g., a nonionic surfactant). Preferably, the pigment dispersion further contains a basic compound. The pigment dispersion can be prepared by adding the pigment to an aqueous solution containing the dispersing resin and dispersing the pigment therein. A bead mill is used as an apparatus for dispersion, for example. In production of the ink, foreign mater and coarse particles may be removed using a filter (e.g., a filter with an opening of 5 μm) after mixing.

[Cleaning Solution]

The cleaning solution contains the second aqueous medium, the second zwitterionic surfactant having an amidoalkylbetaine structure, and the second sugar alcohol. Preferably, the cleaning solution further contain at least one of a basic compound and a nonionic surfactant.

The cleaning solution has a pH of preferably at least 7.5 and no greater than 10.0, and further preferably at least 8.5 and no greater than 9.0. Here, the second zwitterionic surfactant tends to be readily ionized in an alkaline environment to exhibit further excellent lubricating action. Therefore, when the cleaning solution has a pH of at least 7.5 and no greater than 10.0, the water-repellent film of the recording section of the inkjet recording apparatus can be further effectively inhibited from wearing.

In particular, it is preferable that each of the pH of the ink and the pH of the cleaning solution is at least 7.5 and no greater than 10.0. When the pH of the ink and the pH of the cleaning solution are close to each other as above, the ink ejection surface of the recording section can be easily cleaned with the cleaning solution. Preferably, each of the ink and the cleaning solution further contains a basic compound in order that the pH of the ink and the pH of the cleaning solution are close to each other.

(Second Aqueous Medium)

The second aqueous medium is a medium including water. The second aqueous medium may function as a solvent or function as a dispersion medium. Examples of the second aqueous medium include the same aqueous mediums as those listed as examples of the first aqueous medium.

The content ratio of the water in the cleaning solution is preferably at least 30.0% by mass and no greater than 80.0% by mass, and more preferably at least 35.0% by mass and no greater than 55.0% by mass. As a result of the content ratio of the water being set to at least 30.0% by mass and no greater than 80.0% by mass, the ink ejection surface of the recording section can be easily cleaned with the cleaning solution.

The second aqueous medium preferably contains a glycol ether compound, and more preferably contains triethylene glycol monobutyl ether. As a result of the second aqueous medium containing a glycol ether compound, the ink ejection surface of the recording section can be easily cleaned with the cleaning solution. In a case in which the second aqueous medium contains a glycol ether compound, the content ratio of the glycol ether compound in the second aqueous medium is preferably at least 5.0% by mass and no greater than 30.0% by mass, and more preferably at least 10.0% by mass and no greater than 20.0% by mass.

Note that it is preferable that the second aqueous medium further contains 1,5-pentanediol or 2-pyrrolidone in addition to the glycol ether compound.

The content ratio of the water-soluble organic solvent in the cleaning solution is preferably at least 10.0% by mass and no greater than 50.0% by mass, and more preferably at least 20.0% by mass and no greater than 30.0% by mass. As a result of the content ratio of the water-soluble organic solvent being set to at least 10.0% by mass and no greater than 50.0% by mass, the ink ejection surface of the recording section can be easily cleaned with the cleaning solution.

(Second Zwitterionic Surfactant)

The second zwitterionic surfactant has an amidoalkyl-betaine structure. The second zwitterionic surfactant inhibits the water-repellent film of the recording section of the inkjet recording apparatus from wearing. Example of the second zwitterionic surfactant include the same compounds as those listed as examples of the first zwitterionic surfactant.

The second zwitterionic surfactant preferably contains a compound represented by the aforementioned general formula (1). A preferable second zwitterionic surfactant is coconut oil fatty acid amidopropyl betaine, lauric acid amide propyl betaine, or palm kernel amidopropyl betaine.

The content ratio of the second zwitterionic surfactant in the cleaning solution is at least 2.0% by mass and no greater than 22.0% by mass, for example. The content ratio of the second zwitterionic surfactant is preferably at least 8.0% by mass and no greater than 22.0% by mass, and more preferably at least 14.0% by mass and no greater than 18.0% by mass. As a result of the content ratio of the second zwitterionic surfactant being set to at least 8.0% by mass, the water-repellent film of the recording section of the inkjet recording apparatus can be further effectively inhibited from wearing. As a result of the content ratio of the second zwitterionic surfactant being set to no greater than 22.0% by mass, separation of the components of the cleaning solution can be inhibited.

(Second Sugar Alcohol)

In cleaning of the ink ejection surface of the recording section with the cleaning solution, the second sugar alcohol adheres to the surfaces of the ink nozzles of the recording section to moisturize the surfaces of the ink nozzles. As such, the second sugar alcohol enhances ejection stability of the ink. Examples of the second sugar alcohol include the same compounds as those listed as examples of the first sugar alcohol.

Sorbitol or maltitol is preferable as the second sugar alcohol because sorbitol and maltitol are sugar alcohols having characteristics that stably exhibit moisturizing effect without being unaffected by humidity of the outside air.

The content ratio of the second sugar alcohol in the cleaning solution is at least 10.0% by mass and no greater than 22.0% by mass, and preferably at least 13.0% by mass and no greater than 17.0% by mass. As a result of the content ratio of the sugar alcohol being set to at least 10.0% by mass, the surfaces of the ink nozzles can be sufficiently moisturized and ejection stability of the ink can be enhanced. As a result of the content ratio of the second sugar alcohol being set to no greater than 22.0% by mass, an excessive increase in viscosity of the cleaning solution can be suppressed.

(Basic Compound)

A basic compound makes the pH of the cleaning solution more alkaline. Examples of the basic compound that may be contained in the cleaning solution are the same compounds as those listed as examples of the basic compound in the ink. Sodium hydroxide is preferable as the basic compound that may be contained in the cleaning solution.

In a case in which the cleaning solution contains a basic compound, the content ratio of the basic compound in the cleaning solution is preferably at least 0.01% by mass and no greater than 1.0% by mass, and more preferably at least 0.05% by mass and no greater than 0.2% by mass.

(Nonionic Surfactant)

A nonionic surfactant enhances compatibility and dispersion stability of each component contained in the cleaning solution. Examples of the nonionic surfactant that may be contained in the cleaning solution include the same compounds as those listed as examples of the nonionic surfactant in the ink. An ethylene oxide adduct of acetylene glycol is preferable as the nonionic surfactant that may be contained in the cleaning solution.

In a case in which the cleaning solution contains a nonionic surfactant, the content ratio of the nonionic surfactant in the cleaning solution is preferably at least 0.1% by mass and no greater than 2.0% by mass, and more preferably at least 0.2% by mass and no greater than 0.6% by mass.

(Additive)

The cleaning solution may further contain a known additive (e.g., a solution stabilizer, an anti-drying agent, an antioxidant, a viscosity modifier, a pH adjuster, and antifungal agent) according to necessity.

(Method for Producing Cleaning Solution)

The cleaning solution can be produced for example by mixing the second aqueous medium, the second zwitterionic surfactant, the second sugar alcohol, and an optionally added component (e.g., a basic compound and a nonionic surfactant). In production of the cleaning solution, foreign mater and coarse particles may be removed using a filter (e.g., a filter with an opening of 5 μm) after mixing.

Second Embodiment: Inkjet Recording Apparatus

An inkjet recording apparatus according to a second embodiment of the present disclosure is an inkjet recording apparatus including a recording head that uses the ink set of the first embodiment. The recording head includes a recording section that ejects the ink toward an image formation area of a recording medium, and a cleaner that cleans an ink ejection surface of the recording section with the cleaning solution. The ink ejection surface is covered with a water-repellent film. Details of the ink set has been described in association with the first embodiment, and therefore, description of the ink set is omitted. As a result of the inkjet recording apparatus of the present disclosure using the ink set of the first embodiment, the ink is excellent in preservation stability and ejection stability, void defect production and wear of the water-repellent film of the recording section of the inkjet recording apparatus can be inhibited, and images with high image density can be formed.

The following describes the inkjet recording apparatus of the present disclosure with reference to the drawings. Note that the drawings schematically illustrate elements of configuration in order to facilitate understanding and properties of elements of configuration illustrated in the drawings, such as size and number thereof, may be changed appropriately from actual properties thereof. FIG. 1 is a diagram illustrating main components of an inkjet recording apparatus 1 that is an example of the inkjet recording apparatus of the present disclosure.

The inkjet recording apparatus 1 illustrated in FIG. 1 includes recording heads 2, a head housing 3 that holds the recording heads 2, and a conveyance unit 4 that conveys a recording medium (not illustrated). The recording heads 2 include a first recording head 2a, a second recording head 2b, a third recording head 2c, and a fourth recording head 2d. The conveyance unit 4 includes a first roller 4a and a second roller 4b that constitute a conveyance roller pair, and a conveyor belt 4c wound between the first roller 4a and the second roller 4b. The conveyance unit 4 conveys a recording medium placed on the conveyor belt 4c in a given direction (right direction in FIG. 1). In the following description, a direction in which a recording medium is conveyed may be referred to as a conveyance direction X. The first recording head 2a, the second recording head 2b, the third recording head 2c, and the fourth recording head 2d perform image formation by ejecting ink when the recording medium is conveyed to a location directly therebelow.

The first recording head 2a, the second recording head 2b, the third recording head 2c, and the fourth recording head 2d are separate for example by at least 1.2 mm and no greater than 1.5 mm from the conveyance unit 4.

The first recording head 2a ejects a black ink. The black ink is equivalent to the ink in the first embodiment. The second recording head 2b, the third recording head 2c, and the fourth recording head 2d eject color inks (e.g., a cyan ink, a magenta ink, and a yellow ink, respectively).

Figure 2:
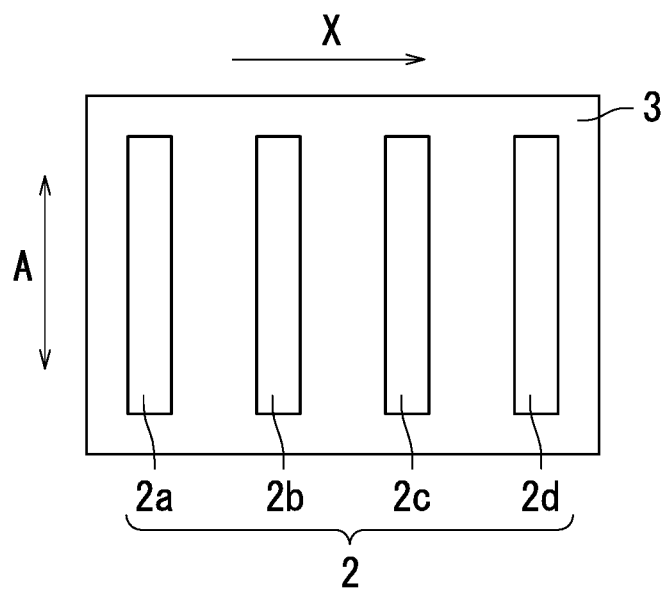
FIG. 2 is a diagram illustrating lower surfaces of recording heads and a head housing, both illustrated in FIG. 1.

FIG. 2 is a diagram illustrating lower surfaces of the recording head 2 and the head housing 3 in FIG. 1. The first recording head 2a, the second recording head 2b, the third recording head 2c, and the fourth recording head 2d each extend in a direction perpendicular to the conveyance direction X (also referred to below as a width direction A).

Figure 3:
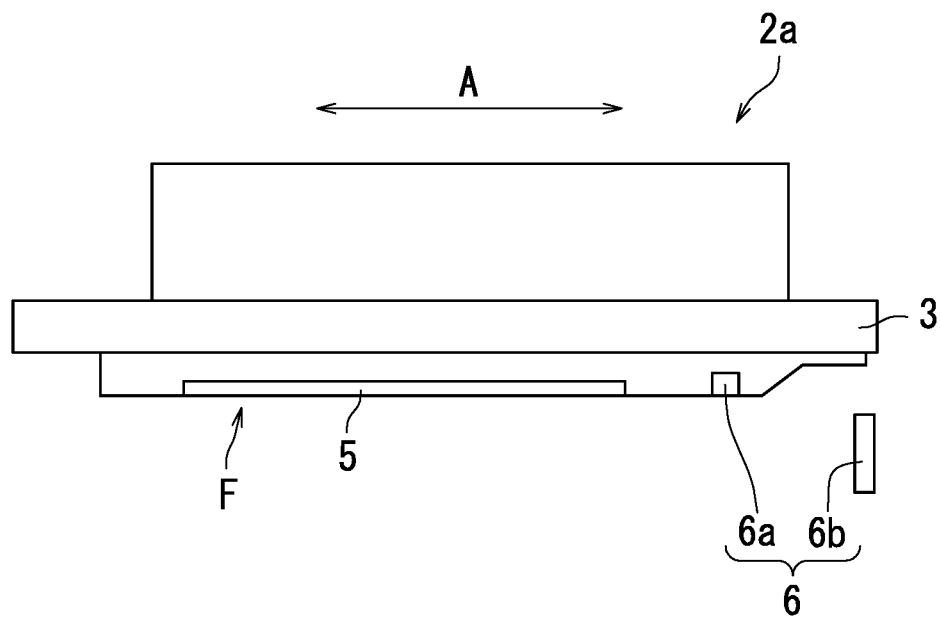
FIG. 3 is a diagram illustrating a side surface of a first recording head in FIG. 1.
Figure 4:
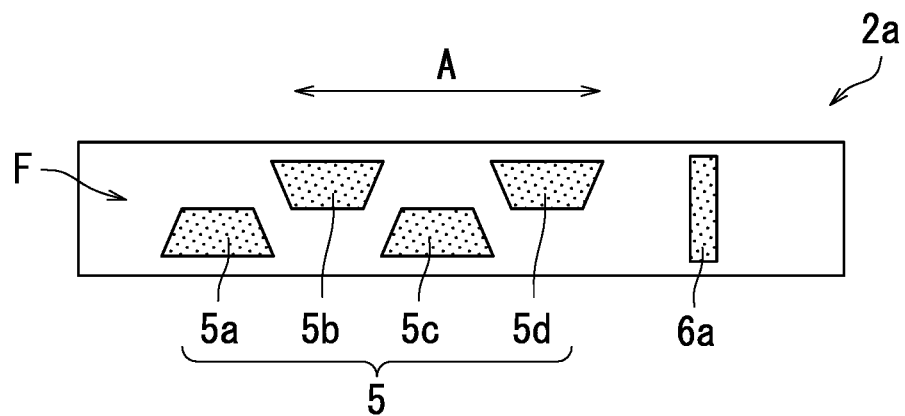
FIG. 4 is an enlarged view of a lower surface of the first recording head in FIG. 3.

FIG. 3 is a diagram illustrating a side surface of the first recording head 2a in FIG. 1. FIG. 4 is an enlarged view of the lower surface of the first recording head 2a in FIG. 3. The first recording head 2a includes a recording section 5 that ejects ink and a cleaner 6 that cleans an ink ejection surface F of the recording section 5 with the cleaning solution described in association with the first embodiment.

The recording section 5 includes a first recording section 5a, a second recording section 5b, a third recording section 5c, and a fourth recording section 5d. The first recording section 5a, the second recording section 5b, the third recording section 5c, and the fourth recording section 5d each have a plurality of ink ejection orifices. The ink ejection surfaces of first recording section 5a, the second recording section 5b, the third recording section 5c, and the fourth recording section 5d each have an area other than the ink ejection orifices that is covered with a water-repellent film.

The cleaner 6 includes a wiper 6b and a cleaning solution supply section 6a provided beside the ink ejection surface F of the recording section 5. The cleaning solution supply section 6a has a plurality of cleaning solution discharge orifices. The cleaning solution supply section 6a supplies the cleaning solution. The wiper 6b has a function of wiping the ink ejection surface F. The wiper 6b is a rubber wiper, for example.

Figure 5:
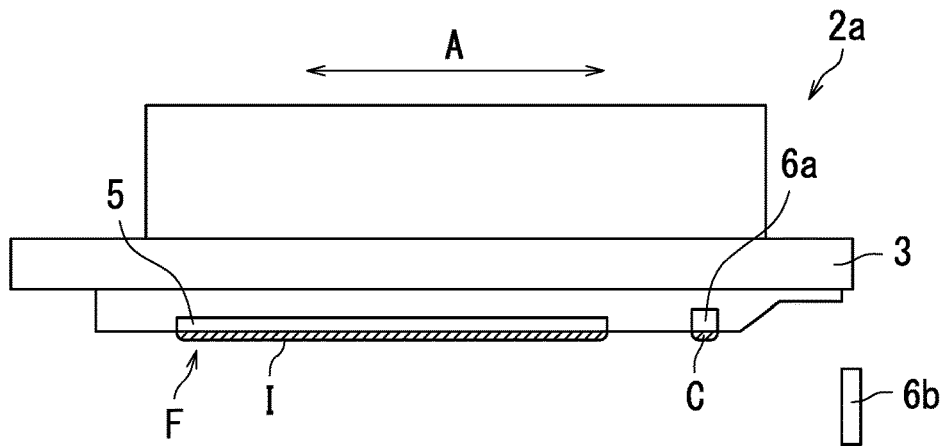
FIG. 5 is a diagram illustrating a process of a cleaning operation performed by the inkjet recording apparatus in FIG. 1.

FIGS. 5 to 8 illustrate a series of processes of a cleaning operation performed by the inkjet recording apparatus 1. In the cleaning operation, a small amount of ink I is purged from the recording section 5 (purging operation) first as illustrated in FIG. 5. Through the purging operation, nozzle clogging or the like in the recording section 5 is removed. The purged ink I adheres to the ink ejection surface F of the recording section 5. In the cleaning operation, cleaning solution C is supplied from the cleaning solution supply section 6a during the purging operation. The supplied cleaning solution C adheres to a location in the vicinity of the ink ejection surface F of the recording section 5 (the lower surface of the cleaning solution supply section 6a).

Figure 6:
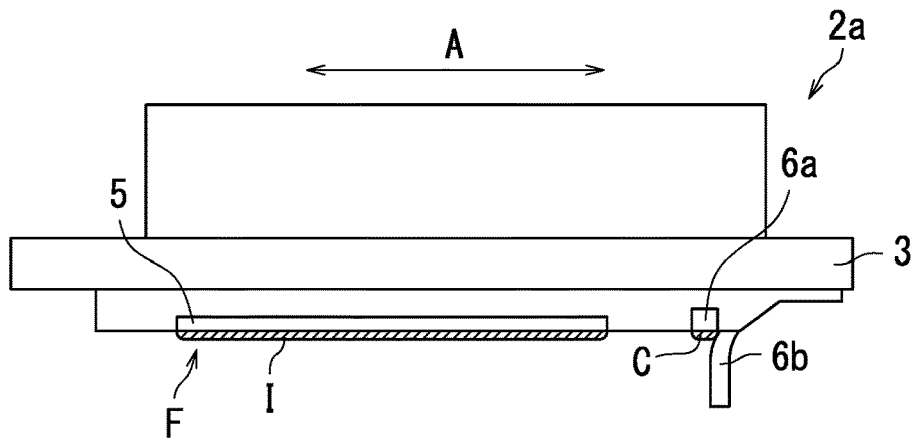
FIG. 6 is a diagram illustrating a process performed next to the process in FIG. 5.
Figure 7:
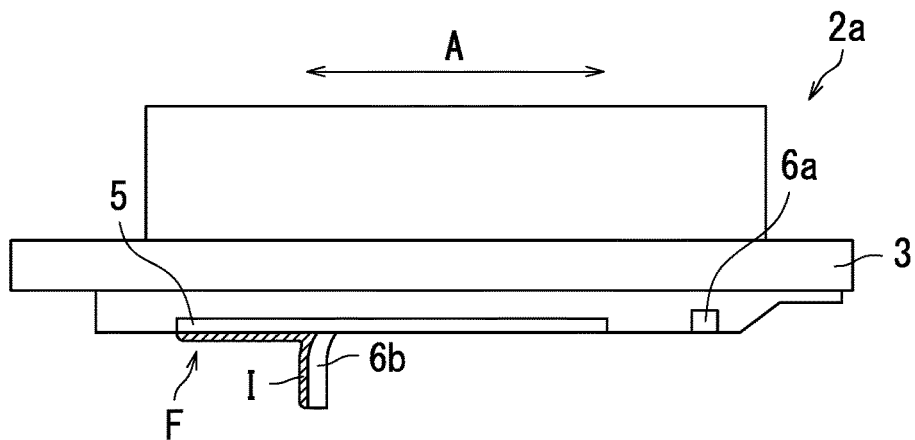
FIG. 7 is a diagram illustrating a process performed next to the process in FIG. 6.
Figure 8:
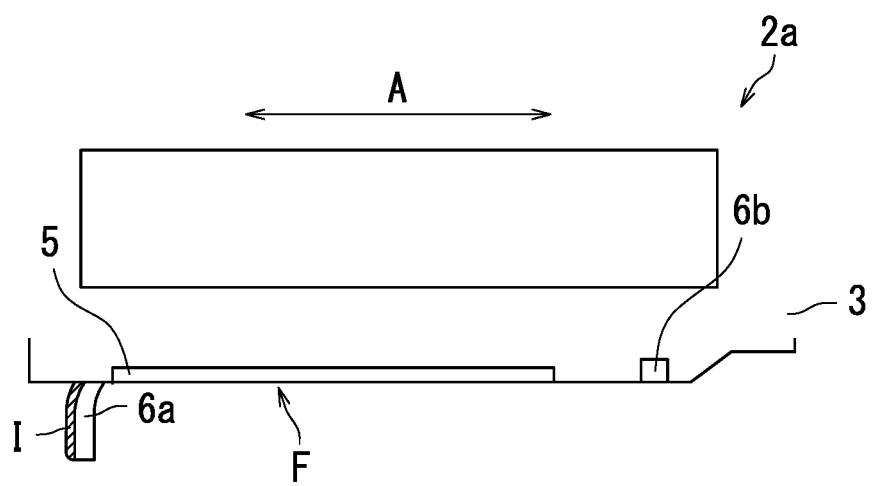
FIG. 8 is a diagram illustrating a process performed next to the process in FIG. 7.

Next, the wiper 6b is pressed against the lower surface of the cleaning solution supply section 6a as illustrated in FIG. 6. As illustrated in FIG. 7, the wiper 6b then moves horizontally (left direction in FIG. 7). In this manner, the wiper 6b wipes off the cleaning solution C adhering to the lower surface of the cleaning solution supply section 6a and the ink I adhering to the lower surface of the ink ejection surface F at once (wiping operation). In the wiping operation, the cleaning solution C is mixed with the ink I. As a result, the cleaning solution C adhering to the lower surface of the cleaning solution supply section 6a and the ink I adhering to the lower surface of the ink ejection surface F are removed therefrom as illustrated in FIG. 8. Through the above, the recording section 5 is cleaned with the cleaning solution C.

In the wiping operation, the water-repellent film covering the ink ejection surface F is abraded by the wiper 6b. However, as a result of the inkjet recording apparatus 1 using the ink set of the first embodiment, the water-repellent film is inhibited from being worn through the wiping operation. The series of processes of the cleaning operation performed by the inkjet recording apparatus 1 has been described so far.

Note that like the first recording head 2a, the second recording head 2b, the third recording head 2c, and the fourth recording head 2d each include the recording section 5 that ejects ink, and the cleaner 6 that cleans the ink ejection surface F of the recording section 5 with a cleaning solution. The cleaning solution used in the cleaning operation by the second recording head 2b, the third recording head 2c, and the fourth recording head 2d may be the cleaning solution described in association with the first embodiment or a known cleaning solution.

The inkjet recording apparatus 1 has been described so far with reference to the drawings. However, the inkjet recording apparatus of the present disclosure is not limited to the inkjet recording apparatus 1 in FIG. 1 and can be altered as follows, for example. In the inkjet recording apparatus of the present disclosure, any of members except the recording heads, the recording sections, and the cleaners may have any configuration and may be omitted. In the inkjet recording apparatus of the present disclosure, the number of the recording heads may be one to three or five or more.

EXAMPLES

The following describes examples of the present disclosure. However, the present invention is not limited to the following examples.

In Examples, pH measurement was performed at a temperature of 25° using a pH meter ("D-51", product of HORIBA, Ltd.).

<Ink Set>

Ink sets of Examples and Comparative Examples were prepared by the following method. Materials used will be described first.

(Carbon Black)

P-1: "NIPex (registered Japanese trademark) 1801Q", product of Orion Engineered Carbons S. A., oil absorption number 140 mL/100 g p-2: "PRINTEX (registered Japanese trademark) L6", product of Orion Engineered Carbons S. A., oil absorption number 126 mL/100 g P-3: "COLOR BLACK S 170", product of Orion Engineered Carbons S. A., oil absorption number 135 mL/100 g P-4: "COLOR BLACK FW 1", product of Orion Engineered Carbons S. A., oil absorption number 150 mL/100 g P-5: "COLOR BLACK FW 200", product of Orion Engineered Carbons S. A., oil absorption number 160 mL/100 g (Zwitterionic Surfactant)

S-1: "SOFTAZOLINE (registered Japanese trademark) CPB", product of Kawaken Fine Chemicals Co., Ltd., coconut oil fatty acid amidopropyl betaine S-2: "AMPHITOL (registered Japanese trademark) 20AB", product of Kao Corporation, lauric acid amide propyl betaine S-3: "SOFTAZOLINE (registered Japanese trademark) PKPB", product of Kawaken Fine Chemicals Co., Ltd., palm kernel amidopropyl betaine s-4: "NISSAN ANON (registered Japanese trademark) BF", product of NOF Corporation, coconut oil alkyl betaine Note that each of the zwitterionic surfactants (S-1) to (S-3) was a zwitterionic surfactant having an amidoalkylbetaine structure. The zwitterionic surfactant (s-4) was a zwitterionic surfactant not having an amidoalkylbetaine structure.

[Preparation of Pigment Dispersion]

(Preparation of Aqueous Dispersing resin Solution)

A thermometer, a reflux cooler, a condenser with a stirrer, and a dripping funnel were set at a four-necked flask, and the four-necked flask equipped with them was used as a reaction vessel. Next, 500 parts by mass of water and 30 parts by mass of ammonium persulfate were charged into the reaction vessel. Subsequently, 246 parts by mass of styrene and 342 parts by mass of acrylic acid were dripped into the reaction vessel over 3 hours while the contents of the reaction vessel were heated and stirred with the internal temperature of the reaction vessel kept in a range of from 75° to 80°. The contents of the reaction vessel were then allowed to react for 6 hours while the internal temperature of the reaction vessel was kept in a range of from 75° to 80°. Next, after the reaction vessel was cooled to room temperature, 30% by mass of an aqueous solution of sodium hydroxide was added into the reaction vessel to neutralize the contents (pH 7.8). Subsequently, distilled water was added into the reaction vessel to adjust the solid concentration of the contents to 40% by mass. Through the above, an aqueous dispersing resin solution containing a dispersing resin (sodium salt of styrene-acrylic acid copolymer) was obtained.

(Preparation of Pigment Dispersion (D-1))

After 8.0 parts by mass of the aqueous dispersing resin solution (dispersing resin 3.2 parts by mass) and 72.0 parts by mass of water were mixed together, 20.0 parts by mass of the pigment (P-1) was added to the resultant mixture. The mixture thus obtained was stirred (pre-mixed) at 5000 rpm for 1 hour using a high-speed disperser (T. K. ROBOMIX and T. K. HOMOGENIZING DISPER Model 2.5, product of PRIMIX Corporation). Thereafter, the resultant mixture was dispersed using a bead mill ("SC MILL", product of Nippon Coke & Engineering Co., Ltd.). In the dispersion, zirconia beads (diameter 0.2 mm) were used as a medium. Furthermore, the filling rate of the medium in a vessel of the bead mill was set to 80% by volume in the dispersion. Next, sodium hydroxide was added to the mixture subjected to the dispersion for pH adjustment to a pH indicated in Table 1 below. Subsequently, the mixture subjected to the pH adjustment was filtered using a filter with an opening y of 5 μm in order to remove contaminated foreign matter and coarse particles. Thus, a pigment dispersion (D-1) was obtained. In the pigment dispersion (D-1), the ratio p of the content of the dispersing resin (3.2 parts by mass) to the content of the carbon black (20.0 parts by mass) was 16.0% by mass.

(Preparation of Pigment Dispersions (D-2) to (D-9))

Pigment dispersions (D-2) to (D-9) were prepared according to the same method as that for preparing the pigment dispersion (D-1) in all aspects other than that the type and the amount of the pigment and amount of the aqueous dispersing resin solution were changed to those indicated in Table 1.

The pH of each of the pigment dispersions (D-1) to (D-9) was measured. Measurement results are shown in Table 1.

Note that "part" in Table 1 refers to part by mass. The ratio p [%] indicates a content [% by mass] of the dispersing resin to a content of a corresponding pigment. The above definitions are also apply to Tables 2 to 5 below.

TABLE 1

| | | | Pigment dispersion | | | | | | | | |
|---|---|---|---|---|---|---|---|---|---|---|---|
| | | | D-1 | D-2 | D-3 | D-4 | D-5 | D-6 | D-7 | D-8 | D-9 |
| Raw material [pat] | Pigment | P-1 | 20.0 | 20.0 | 20.0 | 20.0 | 20.0 | — | — | — | — |
| | | p-2 | — | — | — | — | — | 20.0 | — | — | — |
| | | P-3 | — | — | — | — | — | — | 20.0 | — | — |
| | | P-4 | — | — | — | — | — | — | — | 20.0 | — |
| | | P-5 | — | — | — | — | — | — | — | — | 20.0 |
| | Aqueous dispersing resin solution | | 8.0 | 6.0 | 9.0 | 5.5 | 10.0 | 8.0 | 8.0 | 8.0 | 8.0 |
| | Ion exchange water | | 72.0 | 74.0 | 71.0 | 74.5 | 70.0 | 72.0 | 72.0 | 72.0 | 72.0 |
| Dispersing resin | Part | | 3.2 | 2.4 | 3.6 | 2.2 | 4.0 | 3.2 | 3.2 | 3.2 | 3.2 |
| | Ratio p [%] | | 16.0 | 12.0 | 18.0 | 11.0 | 20.0 | 16.0 | 16.0 | 16.0 | 16.0 |
| pH | | | 9.2 | 9.3 | 9.1 | 9.0 | 9.2 | 9.1 | 9.2 | 9.0 | 9.1 |

[Preparation of Ink]

A solvent mixture was obtained by mixing 8.3 parts by mass of ion exchange water, 15.0 parts by mass of 3-methyl-1,5-pentanediol, 1.0 parts by mass of triethylene glycol monobutyl ether, 3.0 parts by mass of 2-pyrrolidone, 13.0 parts by mass of 1,3-propanediol, and 0.3 parts by mass of 1,2-octanediol. While the resultant solvent mixture was stirred, 50.0 parts by mass of the pigment dispersion (D-1) (1.6 parts by mass of the dispersing resin and 10.0 parts by mass of the pigment), 8.0 parts by mass of sorbitol as the first sugar alcohol, 1.0 parts by mass of the zwitterionic surfactant (S-1) as the first zwitterionic surfactant, and 0.4 parts by mass of a nonionic surfactant ("OLFINE (registered Japanese trademark) E1010", product of Nissin Chemical Industry CO., Ltd., ethylene oxide adduct of acetylenediol) were added to the solvent mixture. Subsequently, the resultant mixture was filtered using a filter with an opening φ of 5 μm in order to remove contaminated foreign matter and coarse particles. Thus, an ink (I-1) was obtained.

Each of inks (I-2) to (I-21) was prepared according to the same method as for preparing the ink (I-1) in all aspects other than that the types and amounts of raw materials were changed so that the prepared ink had a composition shown in Table 2 or 3. The pH of each of the inks (I-1) to (I-21) was measured then. Measurement results are shown in Tables 2 and 3.

The inks (I-1) to (I-5), (I-8), (I-11) to (I-14), (I-16), (I-17), and (I-19) to (I-21) were used as inks for ink sets of Examples. The inks (I-6), (I-7), (I-9), (I-10), (I-15), and (I-18) were used as inks for ink sets of Comparative Examples.

Note that the amounts in rows titled "Ion exchange water" in Tables 2 and 3 each indicate a sum of the amount of ion exchange water added in ink preparation and the amount of ion exchange water contained in a corresponding pigment dispersion. "MPD" refers to 3-methyl-1,5-pentanediol. "BTG" refers to triethylene glycol monobutyl ether. "2-Py" refers to 2-pyrrolidone. "1,5PD" refers to 1,5-pentanediol. "1,3PD" refers to 1,3-propanediol. "1,2OD" refers to 1,2-octanediol.

TABLE 2

| | | I-1 | I-2 | I-3 | I-4 | I-5 | I-6 | I-7 | I-8 | I-9 | I-10 | I-11 |
|---|---|---|---|---|---|---|---|---|---|---|---|---|
| Ion exchange water [part] | | 46.7 | 47.1 | 46.5 | 47.7 | 46.7 | 47.2 | 46.3 | 47.2 | 48.7 | 46.7 | 45.7 |
| Organic solvent [part] | MPD | 15.0 | 15.0 | 15.0 | 15.0 | 10.0 | 15.0 | 15.0 | 15.0 | 15.0 | 15.0 | 10.0 |
| | BTG | 1.0 | 1.0 | 1.0 | 0.0 | 1.0 | 1.0 | 1.0 | 1.0 | 1.0 | 1.0 | 1.0 |
| | 2-Py | 3.0 | 3.0 | 3.0 | 3.0 | 3.0 | 3.0 | 3.0 | 3.0 | 3.0 | 3.0 | 3.0 |
| | 1,5PD | 0.0 | 0.0 | 0.0 | 0.0 | 18.0 | 0.0 | 0.0 | 0.0 | 0.0 | 0.0 | 19.0 |
| | 1,3PD | 13.0 | 13.0 | 13.0 | 13.0 | 0.0 | 13.0 | 13.0 | 13.0 | 15.0 | 13.0 | 0.0 |
| | 1,2OD | 0.3 | 0.3 | 0.3 | 0.3 | 0.3 | 0.3 | 0.3 | 0.3 | 0.3 | 0.3 | 0.3 |
| Sugar alcohol [part] | Sorbitol | 8.0 | 8.0 | 8.0 | 8.0 | 8.0 | 8.0 | 8.0 | 8.0 | 4.0 | 8.0 | 8.0 |
| | Maltitol | — | — | — | — | — | — | — | — | — | — | — |
| Zwitterionic surfactant [part] | S-1 | 1.0 | 1.0 | 1.0 | 1.0 | 1.0 | 1.0 | 1.0 | 0.5 | 1.0 | 1.0 | 1.0 |
| | S-2 | — | — | — | — | — | — | — | — | — | — | — |
| | S-3 | — | — | — | — | — | — | — | — | — | — | — |
| | s-4 | — | — | — | — | — | — | — | — | — | — | — |
| Nonionic surfactant [part] | | 0.4 | 0.4 | 0.4 | 0.4 | 0.4 | 0.4 | 0.4 | 0.4 | 0.4 | 0.4 | 0.4 |
| Dispersing resin | part | 1.6 | 1.2 | 1.8 | 1.6 | 1.6 | 1.1 | 2.0 | 1.6 | 1.6 | 1.6 | 1.6 |
| | Ratio p [%] | 16.0 | 12.0 | 18.0 | 16.0 | 16.0 | 11.0 | 20.0 | 16.0 | 16.0 | 16.0 | 16.0 |
| Pigment [part] | P-1 | 10.0 | 10.0 | 10.0 | 10.0 | 10.0 | 10.0 | 10.0 | 10.0 | 10.0 | — | 10.0 |
| | p-2 | — | — | — | — | — | — | — | — | — | 10.0 | — |
| | P-3 | — | — | — | — | — | — | — | — | — | — | — |
| | P-4 | — | — | — | — | — | — | — | — | — | — | — |
| | P-5 | — | — | — | — | — | — | — | — | — | — | — |
| Pigment dispersion | | D-1 | D-2 | D-3 | D-1 | D-1 | D-4 | D-5 | D-1 | D-1 | D-6 | D-1 |
| pH | | 8.8 | 8.9 | 8.7 | 8.6 | 8.8 | 8.5 | 8.8 | 8.8 | 8.8 | 8.7 | 8.8 |

TABLE 3

| | | I-12 | I-13 | I-14 | I-15 | I-16 | I-17 | I-18 | I-19 | I-20 | I-21 |
|---|---|---|---|---|---|---|---|---|---|---|---|
| Ion exchange water [part] | | 46.7 | 46.7 | 46.7 | 46.7 | 46.7 | 44.7 | 47.7 | 46.7 | 46.7 | 46.7 |
| Organic solvent [part] | MPD | 10.0 | 15.0 | 15.0 | 15.0 | 15.0 | 15.0 | 15.0 | 15.0 | 15.0 | 15.0 |
| | BTG | 1.0 | 1.0 | 1.0 | 1.0 | 1.0 | 1.0 | 1.0 | 1.0 | 1.0 | 1.0 |
| | 2-Py | 3.0 | 3.0 | 3.0 | 3.0 | 3.0 | 3.0 | 3.0 | 3.0 | 3.0 | 3.0 |
| | 1,5PD | 0.0 | 0.0 | 0.0 | 0.0 | 0.0 | 0.0 | 0.0 | 0.0 | 0.0 | 0.0 |
| | 1,3PD | 18.0 | 13.0 | 13.0 | 13.0 | 13.0 | 13.0 | 13.0 | 13.0 | 13.0 | 13.0 |
| | 1,2OD | 0.3 | 0.3 | 0.3 | 0.3 | 0.3 | 0.3 | 0.3 | 0.3 | 0.3 | 0.3 |
| Sugar alcohol [part] | Sorbitol | 8.0 | 8.0 | 8.0 | 8.0 | — | 8.0 | 8.0 | 8.0 | 8.0 | 8.0 |
| | Maltitol | — | — | — | — | 8.0 | — | — | — | — | — |
| Zwitterionic surfactant [part] | S-1 | 1.0 | — | — | — | 1.0 | 3.0 | — | 1.0 | 1.0 | 1.0 |
| | S-2 | — | 1.0 | — | — | — | — | — | — | — | — |
| | S-3 | — | — | 1.0 | — | — | — | — | — | — | — |
| | s-4 | — | — | — | 1.0 | — | — | — | — | — | — |
| Nonionic surfactant [part] | | 0.4 | 0.4 | 0.4 | 0.4 | 0.4 | 0.4 | 0.4 | 0.4 | 0.4 | 0.4 |

TABLE 3-continued

|  |  | Ink | | | | | | | | | |
|---|---|---|---|---|---|---|---|---|---|---|---|
|  |  | I-12 | I-13 | I-14 | I-15 | I-16 | I-17 | I-18 | I-19 | I-20 | I-21 |
| Dispersing resin | Part by mass | 1.6 | 1.6 | 1.6 | 1.6 | 1.6 | 1.6 | 1.6 | 1.6 | 1.6 | 1.6 |
|  | Ratio p [%] | 16.0 | 16.0 | 16.0 | 16.0 | 16.0 | 16.0 | 16.0 | 16.0 | 16.0 | 16.0 |
| Pigment [part] | P-1 | 10.0 | 10.0 | 10.0 | 10.0 | 10.0 | 10.0 | 10.0 | — | — | — |
|  | p-2 | — | — | — | — | — | — | — | — | — | — |
|  | P-3 | — | — | — | — | — | — | — | 10.0 | — | — |
|  | P-4 | — | — | — | — | — | — | — | — | 10.0 | — |
|  | P-5 | — | — | — | — | — | — | — | — | — | 10.0 |
| Pigment dispersion |  | D-1 | D-1 | D-1 | D-1 | D-1 | D-1 | D-1 | D-7 | D-8 | D-9 |
| pH |  | 8.8 | 8.8 | 8.8 | 8.8 | 8.8 | 8.8 | 8.8 | 8.8 | 8.6 | 8.7 |

[Preparation of Cleaning Solution]

Mixing was performed of 47.4 parts by mass of ion exchange water, 15.0 parts by mass of sorbitol as the second sugar alcohol, 5.0 parts by mass of 1,5-pentanediol, 7.0 parts by mass of 2-pyrrolidone, 13.0 parts by mass of triethylene glycol monobutyl ether as a glycol ether compound, 0.1 parts by mas of sodium hydroxide as a basic compound, 0.5 parts by mass of a nonionic surfactant ("OLFINE (registered Japanese trademark) E1010", product of Nissin Chemical Industry Co., Ltd., ethylene oxide adduct of acetylenediol), and 12.0 parts by mass of the zwitterionic surfactant (S-1) as the second zwitterionic surfactant. The resultant mixture was filtered using a filter with an opening y of 5 μm in order to remove contaminated foreign matter and coarse particles. Thus, a cleaning solution (C-1) was obtained.

Cleaning solutions (C-2) to (C-12) were prepared according to the same method as that for preparing the cleaning solution (C-1) in all aspects other than that the types and amounts of the raw materials used were changed to those indicated in Tables 4 and 5. The pH of each of the cleaning solutions (C-1) to (C-12) was measured then. Measurement results are shown in Tables 4 and 5.

The cleaning solutions (C-1) to (C-6), (C-8), (C-9), and (C-11) were used as cleaning solutions used in the ink sets of Examples. The cleaning solutions (C-7), (C-10), and (C-12) were used as cleaning solutions used in the ink sets of Comparative Examples.

TABLE 4

|  |  | Cleaning solution | | | | | |
|---|---|---|---|---|---|---|---|
|  |  | C-1 | C-2 | C-3 | C-4 | C-5 | C-6 |
| Ion exchange water [part] |  | 47.4 | 43.4 | 39.4 | 48.4 | 38.4 | 56.4 |
| Sugar alcohol [part] | Sorbitol | 15.0 | 15.0 | 15.0 | 10.0 | 20.0 | 15.0 |
|  | Maltitol | — | — | — | — | — | — |
| Organic solvent [part] | 1,5-Pentanediol | 5.0 | 5.0 | 5.0 | 5.0 | 5.0 | 5.0 |
|  | 2-Pyrrolidone | 7.0 | 7.0 | 7.0 | 7.0 | 7.0 | 7.0 |
|  | Triethylene glycol monobutyl ether | 13.0 | 13.0 | 13.0 | 13.0 | 13.0 | 13.0 |
| Sodium hydroxide [part] |  | 0.1 | 0.1 | 0.1 | 0.1 | 0.1 | 0.1 |
| Nonionic surfactant [part] |  | 0.5 | 0.5 | 0.5 | 0.5 | 0.5 | 0.5 |
| Zwitterionic Surfactant [part] | S-1 | 12.0 | 16.0 | 20.0 | 16.0 | 16.0 | 3.0 |
|  | S-2 | — | — | — | — | — | — |
|  | S-3 | — | — | — | — | — | — |
|  | s-4 | — | — | — | — | — | — |
| pH |  | 8.7 | 8.8 | 8.9 | 8.7 | 8.9 | 8.7 |

TABLE 5

|  |  | Cleaning solution | | | | | |
|---|---|---|---|---|---|---|---|
|  |  | C-7 | C-8 | C-9 | C-10 | C-11 | C-12 |
| Ion exchange water [part] |  | 49.4 | 43.4 | 43.4 | 43.4 | 43.4 | 59.4 |
| Sugar alcohol [part] | Sorbitol | 9.0 | 15.0 | 15.0 | 15.0 | — | 15.0 |
|  | Maltitol | — | — | — | — | 15.0 | — |
| Organic solvent [part] | 1,5-Pentanediol | 5.0 | 5.0 | 5.0 | 5.0 | 5.0 | 5.0 |
|  | 2-Pyrrolidone | 7.0 | 7.0 | 7.0 | 7.0 | 7.0 | 7.0 |
|  | Triethylene glycol monobutyl ether | 13.0 | 13.0 | 13.0 | 13.0 | 13.0 | 13.0 |
| Sodium hydroxide [part] |  | 0.1 | 0.1 | 0.1 | 0.1 | 0.1 | 0.1 |
| Nonionic surfactant [part] |  | 0.5 | 0.5 | 0.5 | 0.5 | 0.5 | 0.5 |
| Zwitterionic Surfactant [part] | S-1 | 16.0 | — | — | — | 16.0 | — |
|  | S-2 | — | 16.0 | — | — | — | — |
|  | S-3 | — | — | 16.0 | — | — | — |
|  | s-4 | — | — | — | 16.0 | — | — |
| pH |  | 8.6 | 8.8 | 8.8 | 8.8 | 8.8 | 8.8 |

[Combination]

Combinations of any of the inks (I-1) to (I-21) and any of the cleaning solutions (C-1) to (C-12) as indicated in Table 6 below were made. Through the above, ink sets (IS-1) to (IS-23) of Examples 1 to 23 and ink sets (is-1) to (is-9) of Comparative Examples 1 to 9 were prepared.

<Evaluation>

With respect to each of the ink sets (IS-1) to (IS-23) and (is-1) to (is-9), image density of formed images, inhibition of void defect production, preservation stability of the ink, ejection stability of the ink (specifically, ink adhesion and accuracy of ink placement), and inhibition of wear of a water-repellent film of a recording section of an inkjet recording apparatus were evaluated by the following methods. Evaluation results are shown in Table 6. Each evaluation was performed in a normal-temperature and normal-humidity environment (temperature 25°, relative humidity 50%). Furthermore, paper was conveyed so that the long side of the paper was perpendicular to the paper conveyance direction in tests involving printing (evaluation of image density, evaluation of inhibition of void defect production, ejection stability of the ink, and evaluation of inhibition of water-repellent film wear). In addition, the conveyance speed of the paper was 350 mm/second.

In each evaluation, an image forming apparatus including a recording head (inkjet recording apparatus with a line head, testing apparatus produced by KYOCERA Document Solutions Inc.) was used. The recording head included a recording section that performs ink ejection and a cleaner that cleans an ink ejection surface of the recording section. A water-repellent film was formed on the ink ejection surface of the recording section. The cleaner includes a cleaning solution supply section that supplies a cleaning solution to the vicinity of the ink ejection surface, and a wiper that wipes the ink ejection surface. An ink tank of the evaluation apparatus was charged with an ink (specifically, any of the inks (I-1) to (I-21)) included in an ink set that is an evaluation target. Furthermore, a cleaning solution tank of the evaluation apparatus was charged with a cleaning solution (specifically, any of the cleaning solutions (C-1) to (C-12)) included in the ink set that is the evaluation target.

[Image Density]

In evaluation of image density, plain paper ("C2", product of Fuji Xerox Co. Ltd., A4-size plain paper copier (PPC) paper) was used as a recording medium. Using the evaluation apparatus, a solid image with a size of 150 mm×200 mm was formed on five sheets of the recording medium. In formation of the solid image, the ink ejection amount was set to 11 pL per pixel. Next, the five sheets of the recording medium were preserved in a normal-temperature and normal-humidity environment for a whole day and night. The five sheets of the recording medium after the preservation were used as evaluation targets for evaluation of image density. Next, the image density of each solid image formed on the five evaluation targets was measured using a reflectance densitometer ("RD-19", product of X-Rite Inc.). In the image density measurement, each image density of randomly selected ten locations was measured for each of the evaluation targets. An average value of the image densities measured at the 50 locations of the five evaluation targets was taken to be an evaluation value (OD) for evaluation of image density. Image density was evaluated in accordance with the following criteria.

(Evaluation Criteria for Image Density)
A (good): OD of at least 1.10
B (poor): OD of less than 1.10

[Inhibition of Void Defect Production]

The five sheets of the recording medium preserved in the evaluation of image density were used as evaluation targets for evaluation of inhibition of void defect production. The solid images formed on the five evaluation targets ware read using a scanner. The number of white dots with a diameter of at least 150 μm appearing on each read solid image was counted using image processing software "ImageJ (public domain)". Inhibition of void defect production was evaluated in accordance with the following criteria.

(Evaluation Criteria for Inhibition of Void Defect Production)
A (particularly good): number of white dots of less than 10
B (good): number of white dots of at least 10 and less than 30
C (poor): number of white dots of 30 or more

[Preservation Stability of Ink]

An index of preservation stability of an ink is a range of variation in viscosity of the ink where the ink is exposed in a high-temperature environment for long period of time. In evaluation of preservation stability of the inks, the viscosity (initial viscosity $V_1$) of each ink (an ink included in any of the ink sets) that was an evaluation target was measured first. Next, approximately 30 g of the ink was charged into a 50-mL test vessel. Subsequently, the test vessel was placed in a thermostatic chamber set at an internal temperature of 60° C., and subjected to heating for one month. The test vessel was taken out of the thermostatic chamber then, and left to stand until the temperature of the ink was decreased to room temperature. Next, the viscosity (post-treatment viscosity $V_2$) of the ink in the test vessel was measured. A viscosity variation rate [%] was determined by the following formula from the initial viscosity $V_1$ and the post-treatment viscosity $V_2$. The determined viscosity variation rate [%] was taken to be an evaluation value for evaluation of preservation stability of the ink. The preservation stability of the ink was evaluated in accordance with the following criteria. Note that the viscosity of the ink was measured using an oscillation type viscometer ("VM-200T", product of NITTETUS HOKKAIDO SEIGYO SISUTEMU KK).

$$\text{Viscosity variation rate}[\%]=100\times(V_1-V_2)/V_1$$

(Evaluation Criteria for Preservation Stability of Ink)
A (particularly good): absolute value of viscosity variation rate of less than 2%
B (good): absolute value of viscosity variation rate of at least 2% and no greater than 5%
C (poor): absolute value of viscosity variation rate of greater than 5%

[Ink Adhesion]

In evaluation of ink adhesion, super fine paper (matte coated paper for inkjet use, A4 size) was used as a recording medium.

Using the evaluation apparatus, a pattern image was continuously printed on 5000 sheets of the recording medium. In the continuous printing, the conveyance speed of the paper was fast enough to print 150 A4-size sheets per minute at horizontal feed. After the continuous printing, cleaning operation was performed on the recording section of the evaluation apparatus. Specifically, a small amount of the ink was discharged from the recording section of the evaluation apparatus (purging operation). At the same time, the cleaning solution was supplied to the vicinity of the ink ejection surface of the recording section from the cleaning solution supply section of the cleaner. Next, the ink ejection surface was wiped using the wiper (wiping operation). Through the wiping operation, ink adhering to the ink ejection surface of the recording section was removed together with the cleaning solution. Details of the cleaning operation performed in this test was substantially the same as the cleaning operation illustrated in FIGS. 5 to 8. Next, the ink ejection surface of the recording section was observed using a microscope to check the presence or absence of remaining ink that could not have been removed. Ink adhesion was evaluated in accordance with the following criteria.

(Evaluation Criteria for Ink Adhesion)
A (particularly good): No ink adheres to the ink ejection surface at all.
B (good): A slight amount of ink adheres to the ink ejection surface.
C (poor): Ink definitely adheres to the ink ejection surface.

[Accuracy of Ink Placement]

In evaluation of accuracy of ink placement, "SUPER FINE PAPER (matte coated paper for inkjet use)" produced by SEIKO EPSON CORPORATION was used as a recording medium. Also, the evaluation apparatus after being left to stand for 90 minutes after the evaluation of ink adhesion (i.e., the evaluation apparatus after the continuous printing on 5000 sheets of the recording medium and the cleaning operation) was used in evaluation of accuracy of ink placement.

A striped image of a plurality of fine lines was formed on the recording medium by ejecting the ink from the recording section of the evaluation apparatus. In the formation of the striped image, the line width of the fine lines is set to be equivalent to one pixel and intervals between adjacent fine lines (line pitch) was set to be equivalent to three pixels. The striped image formed on the recording medium was observed using a microscope. Specifically, an interval A between a specific fine line a and a fine line b 16 pixels apart from the fine line a was measured at 204 locations. Note that three other fine lines were present between the fine line a and the fine line b. Dispersion (3σ) of the measured intervals A was calculated using image processing software (product of KYOCERA Document Solutions Inc.). The calculated dispersion (3σ) of the measured intervals was taken to be an evaluation value for evaluation of accuracy of ink placement. The accuracy of ink placement was evaluated in accordance with the following criteria.

(Evaluation Criteria for Accuracy of Ink Placement)
A (good): 3σ of less than 15
B (poor): 3σ of at least 15

Ejection stability of an ink was determined to be good if the ink was rated as A (especially good) or B (good) in evaluation of ink adhesion and rated as A (good) in evaluation of accuracy of ink placement, and determined to be poor if the ink was rated as C (poor) in evaluation of ink adhesion or rated as B (poor) in evaluation of accuracy of ink placement.

[Inhibition of Wear of Water-Repellent Film]

The static contact angle (initial contact angle θ1) was measured of the water-repellent film formed on the ink ejection surface of the recording section of the evaluation apparatus with ion exchange water. The initial contact angle θ1 was 105°. Next, the above-described cleaning operation was performed on the recording section of the evaluation apparatus 35,000 times (35,000-time purging operation and 35,000-time wiping operation). In the 35,000-time cleaning operation, the static contact angle of the water-repellent film with ion exchange water was measured directly after the $3000^{th}$ cleaning operation, the $10,000^{th}$ cleaning operation, the $20,000^{th}$ cleaning operation, and the $35,000^{th}$ cleaning operation. When a measured static contact angle was smaller by 10° or more than the initial contact angle θ1, it was determined that the water-repellent film had been worn away. The number of times of the cleaning operation necessary to wear away the water-repellent film was taken to be an evaluation value for evaluation of inhibition of wear of the water-repellent film. The inhibition of wear of the water-repellent film was evaluated in accordance with the following criteria. In the following criteria, A, B, and C were taken to be acceptable and D was taken to be unacceptable. Note that a contact angle measuring device ("OCA40", product of EKO instruments Co., Ltd.) was used to measure the static contact angle.

(Evaluation Criteria for Inhibition of Wear of Water-Repellent Film)
A: The water-repellent film was worn away after more than 20,001 times and less than 35,000 times of the cleaning operation.
B: The water-repellent film was worn away after more than 10,001 times and less than 20,000 times of the cleaning operation.
C: The water-repellent film was worn away after more than 3001 times and less than 10,000 times of the cleaning operation.
D: The water-repellent film was worn away after more than one time and less than 3000 times of the cleaning operation.

TABLE 6

| | Ink set | Ink | Cleaning solution | Image density OD | Image density Evaluation | Void defects | Preservation stability | Ink adhesion | Accuracy of ink placement | Wear of water-repellent film |
|---|---|---|---|---|---|---|---|---|---|---|
| Example 1 | IS-1 | I-1 | C-2 | 1.20 | A | A | A | A | A | A |
| Example 2 | IS-2 | I-2 | C-2 | 1.28 | A | A | B | B | A | B |
| Example 3 | IS-3 | I-3 | C-2 | 1.16 | A | B | A | A | A | A |
| Example 4 | IS-4 | I-4 | C-2 | 1.25 | A | A | B | B | A | A |
| Example 5 | IS-5 | I-5 | C-2 | 1.13 | A | B | A | A | A | A |
| Comparative Example 1 | is-1 | I-6 | C-2 | 1.30 | A | A | C | C | B | B |
| Comparative Example 2 | is-2 | I-7 | C-2 | 1.13 | A | C | A | A | A | A |
| Example 6 | IS-6 | I-8 | C-2 | 1.21 | A | A | A | A | A | C |
| Comparative Example 3 | is-3 | I-9 | C-2 | 1.21 | A | A | A | C | B | B |
| Comparative Example 4 | is-4 | I-10 | C-2 | 1.06 | B | C | A | A | A | A |
| Example 7 | IS-7 | I-11 | C-2 | 1.15 | A | B | A | A | A | B |
| Example 8 | IS-8 | I-12 | C-2 | 1.28 | A | A | B | B | A | B |
| Example 9 | IS-9 | I-1 | C-1 | 1.20 | A | A | A | B | A | B |
| Example 10 | IS-10 | I-1 | C-3 | 1.20 | A | A | A | A | A | A |
| Example 11 | IS-11 | I-1 | C-4 | 1.20 | A | A | A | B | A | A |
| Example 12 | IS-12 | I-1 | C-5 | 1.20 | A | A | A | A | A | A |
| Example 13 | IS-13 | I-1 | C-6 | 1.20 | A | A | A | A | A | C |
| Comparative Example 5 | is-5 | I-1 | C-7 | 1.20 | A | A | A | C | B | B |
| Example 14 | IS-14 | I-13 | C-2 | 1.20 | A | A | A | A | A | A |
| Example 15 | IS-15 | I-14 | C-2 | 1.20 | A | A | A | A | A | A |
| Example 16 | IS-16 | I-16 | C-2 | 1.20 | A | A | A | A | A | A |
| Example 17 | IS-17 | I-17 | C-2 | 1.20 | A | A | A | A | A | A |
| Example 18 | IS-18 | I-19 | C-2 | 1.15 | A | B | A | A | A | A |
| Example 19 | IS-19 | I-20 | C-2 | 1.30 | A | A | A | A | A | B |
| Comparative Example 6 | is-6 | I-15 | C-2 | 1.20 | A | A | A | A | A | D |
| Comparative Example 7 | is-7 | I-18 | C-2 | 1.20 | A | A | A | A | A | D |
| Example 20 | IS-20 | I-21 | C-2 | 1.35 | A | A | A | A | A | C |

TABLE 6-continued

|  | Ink set | Ink | Cleaning solution | Image density OD | Image density Evaluation | Void defects | Preservation stability | Ink adhesion | Accuracy of ink placement | Wear of water-repellent film |
|---|---|---|---|---|---|---|---|---|---|---|
| Example 21 | IS-21 | I-1 | C-8 | 1.20 | A | A | A | A | A | A |
| Example 22 | IS-22 | I-1 | C-9 | 1.20 | A | A | A | A | A | A |
| Example 23 | IS-23 | I-1 | C-11 | 1.20 | A | A | A | A | A | A |
| Comparative Example 8 | is-8 | I-1 | C-10 | 1.20 | A | A | A | A | A | D |
| Comparative Example 9 | is-9 | I-1 | C-12 | 1.20 | A | A | A | A | A | D |

Each of the ink sets (IS-1) to (IS-23) of Examples 1 to 23 included an ink and a cleaning solution. The ink contained a first aqueous medium, a carbon black, a dispersing resin, a first zwitterionic surfactant having an amidoalkylbetaine structure, and a first sugar alcohol. The carbon black had an oil absorption number of at least 130 mL/100 g and no greater than 165 mL/100 g. The ratio p of the content of the dispersing resin to the content of the carbon black was at least 12.0% by mass and no greater than 19.0% by mass. The content ratio of the first sugar alcohol in the ink was at least 5.0% by mass and no greater than 15.0% by mass. The cleaning solution contained a second aqueous medium, a second zwitterionic surfactant having an amidoalkylbetaine structure, and a second sugar alcohol. The second sugar alcohol had a content ratio in the cleaning solution of at least 10.0% by mass and no greater than 22.0% by mass. Each of the ink sets (IS-1) to (IS-23) was excellent in preservation stability and ejection stability of the ink, can inhibit void defect production and wear of the water-repellent film of the recording section of the inkjet recording apparatus, and achieve formation of images with high image density.

By contrast, the ink set (is-1) of Comparative Example 1 included the ink (I-6) as the ink. The ratio p of the content of the dispersing resin to the content of the carbon black in the ink (I-6) was less than 12.0% by mass. It is determined that the carbon black was dispersed in an unstable state in the ink (I-6) as a result of the ink (I-6) containing an insufficient amount of the dispersing resin. Therefore, the ink set (is-1) was rated as poor in evaluation of preservation stability and ejection stability of the ink.

The ink set (is-2) of Comparative Example 2 included the ink (I-7) as the ink. The ratio p of the content of the dispersing resin to the content of the carbon black in the ink (I-7) was greater than 19.0% by mass. It is determined that the carbon black was dispersed in a state more stable than needed in the ink (I-7) as a result of the ink (I-7) containing an excessive amount of the dispersing resin. Therefore, the ink set (is-2) was rated as poor in evaluation of inhibition of void defect production.

The ink set (is-3) of Comparative Example 3 included the ink (I-9) as the ink. The first sugar alcohol (I-9) had a content ratio in the ink of less than 5.0% by mass. It is determined that the surfaces of ink nozzles of the inkjet recording apparatus were insufficiently moisturized due to shortage of the first sugar alcohol in the ink (I-9). Therefore, the ink set (is-3) was rated as poor in evaluation of ejection stability of the ink.

The ink set (is-4) of Comparative Example 4 included the ink (I-10) as the ink. The carbon black in the ink (I-10) had an oil absorption number of less than 130 mL/100 g. The carbon black with an oil absorption number as above is not complicated in structure, and therefore considered to be easy to penetrate into a recording medium once the ink (I-10) has landed on the surface of the recording medium. Therefore, the ink set (is-4) was rated as poor in evaluation of image density of formed images and evaluation of inhibition of void defect production.

The ink set (is-5) of Comparative Example 5 included the cleaning solution (C-7) as the cleaning solution. The content ratio of the second sugar in the cleaning solution (C-7) was less than 10.0% by mass. It is determined that the surfaces of the ink nozzles of the inkjet recording apparatus was insufficiently moisturized due to shortage of the second sugar alcohol in the cleaning solution (C-7). Therefore, the ink set (is-5) was rated as poor in evaluation of ejection stability of the ink.

The ink sets (is-6) and (is-7) of Comparative Examples 6 and 7 respectively included the ink (I-15) and the ink (I-18) as the ink. The inks (I-15) and (I-18) did not contain the first zwitterionic surfactant. It is determined that the inks (I-15) and (I-18) did not exhibit excellent lubricating action by the first zwitterionic surfactant in cleaning on the ink ejection surface of the recording section. Therefore, the ink sets (is-6) and (is-7) were rated as poor in evaluation of inhibition of wear of the water-repellent film of the recording section of the inkjet recording apparatus.

The ink sets (is-8) and (is-9) of Comparative Examples 8 and 9 respectively included the cleaning solution cleaning (C-10) and the cleaning solution (C-12) as the cleaning solution. The cleaning solutions (C-10) and (C-12) did not contain a second zwitterionic surfactant. It is determined that the cleaning solutions (C-10) and (C-12) did not exhibit excellent lubricating action by the second zwitterionic surfactant in cleaning on the ink ejection surface of the recording section. Therefore, the ink set (is-8) and (is-9) were rated as poor in evaluation of inhibition of wear of the water-repellent film of the recording section of the inkjet recording apparatus.

What is claimed is:

1. An ink set comprising an inkjet ink and a cleaning solution, wherein
    the inkjet ink contains a first aqueous medium, a carbon black, a dispersing resin, a first zwitterionic surfactant having an amidoalkylbetaine structure, and a first sugar alcohol,
    the carbon black has an oil absorption number of at least 140 mL/100 g and no greater than 145 mL/100 g,
    a ratio of a content of the dispersing resin to a content of the carbon black is at least 14.0% by mass and no greater than 16.0% by mass,
    the first zwitterionic surfactant has a content ratio in the inkjet ink of at least 0.7% by mass and no greater than 2.0% by mass, the first sugar alcohol has a content ratio in the inkjet ink of at least 5.0% by mass and no greater than 15.0% by mass, the cleaning solution contains a second aqueous medium, a second zwitterionic surfactant having an amidoalkyl-betaine structure, and a second sugar alcohol, the second zwitterionic surfactant has a content ratio in the cleaning solution of at least 14.0% by mass and no greater than 22.0% by mass, the second sugar alcohol has a content ratio in the cleaning solution of at least 13.0% by mass and no greater than 22.0% by mass, the first aqueous medium contains water and a water-soluble organic solvent, the water-soluble organic solvent includes 3-methyl-1,5-pentanediol and glycol ether, and the 3-methyl-1,5-pentanediol has a content ratio in the first aqueous medium of at least 19.0% by mass and no greater than 19.5% by mass.

2. The ink set according to claim 1, wherein
the inkjet ink and the cleaning solution each further contain a basic compound, and
the inkjet ink and the cleaning solution each have a pH of at least 7.5 and no greater than 10.0.

3. The ink set according to claim 1, wherein
the first sugar alcohol and the second sugar alcohol each include sorbitol or maltitol.

4. The ink set according to claim 1, wherein
the first zwitterionic surfactant and the second zwitterionic surfactant each contain a compound represented by general formula (1):

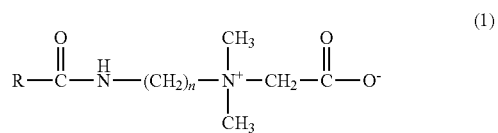

where in the general formula (1), R represents a monovalent chain hydrocarbon group having a carbon number of at least 6 and no greater than 20, and n represents an integer of at least 1 and no greater than 5.

5. The ink set according to claim 1, wherein
the second aqueous medium contains a glycol ether compound.

6. The ink set according to claim 1, wherein
the content ratio of the second sugar alcohol in the cleaning solution is at least 20.0% by mass and no greater than 22.0% by mass.

* * * * *